United States Patent [19]

Morrison et al.

[11] Patent Number: 4,997,267

[45] Date of Patent: Mar. 5, 1991

[54] UNIVERSAL EYEGLASS FRAME

[76] Inventors: Robert J. Morrison, Green & Division Sts., Harrisburg, N.J. 17110; James Morrison, 14 Wiley La., Woodstock, N.Y. 12496

[21] Appl. No.: 482,481

[22] Filed: Feb. 21, 1990

[51] Int. Cl.⁵ .......................... G02C 5/04; G02C 5/12
[52] U.S. Cl. ...................................... 351/41; 351/128; 351/137; 351/156
[58] Field of Search ...................... 351/41, 47, 52, 57, 351/58, 59, 60, 128, 156, 157, 204, 137; D16/102, 107, 108; 33/200

[56] References Cited

U.S. PATENT DOCUMENTS 3,787,113  1/1974  Shedrow .......................... 351/47 X Primary Examiner—Rodney B. Bovernick
Attorney, Agent, or Firm—Robert A. Green

[57] ABSTRACT

The disclosure is an eyeglass frame including a straight relatively rigid bar having a plurality of notches disposed along its length, and carrying a generally U-shaped nose piece having a tab adapted to be inserted in and locked in the central notch in the bar. The bar also carries a pair of circular lens holders having tabs for insertion in selected notches in the bar so that the spacing between the lens holders and the lenses carried thereby can be adjusted. A headband is also provided having tabs for insertion in notches in the frame bar to hold the frame on the head of the user.

7 Claims, 1 Drawing Sheet

UNIVERSAL EYEGLASS FRAME

BACKGROUND OF THE INVENTION

At the present time, commercially available eyeglass frames are predetermined in size and shape and cannot be adjusted to any great extent to accommodate different wearers. This is not a problem in civilized countries in which purveyors of frames have many different sizes and shapes to accommodate a buyer.

However, in third world countries or in remote areas of any country where eyeglasses may not even be available, providing eyeglass frames is a difficult problem for which there is no presently known solution.

SUMMARY OF THE INVENTION

The present invention provides an eyeglass frame which is completely universal and can be adjusted by means of interlocking parts to accommodate wearers of different sizes and shapes.

DESCRIPTION OF THE INVENTION

Figure 1:
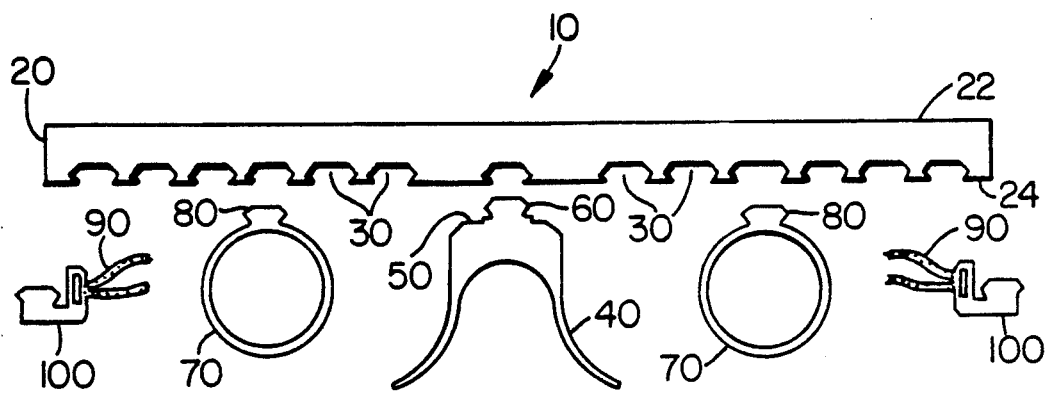
FIG. 1 is an exploded view of some of the parts of a universal eyeglass frame.
Figure 2:
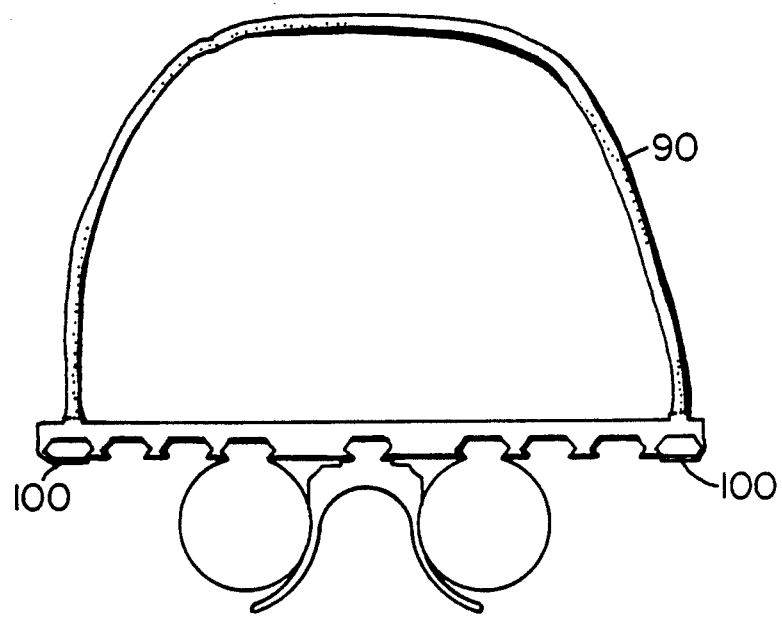
FIG. 2 is a front elevational view of an assembled frame illustrating how it is worn.

An universal eyeglass frame 10 embodying the invention includes a frame front and insert bar 20 comprising a relatively rigid bar of metal, but preferably plastic, which is relatively thin and includes a top edge 22 and a lower edge 24. The lower edge 24 of the frame bar 20 is provided with a plurality of similarly shaped notches 30 which may be of varied width if necessary.

Figure 4:
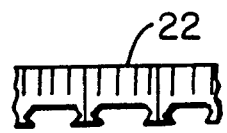
FIG. 4 is a front elevational view of a modification of another portion of the invention.

The back surface of the frame bar 20 (FIG. 4) is provided with appropriate markings to facilitate the proper placement of the lens carrier (to be described) in accordance with the patient's pupillary distance.

The frame 10 includes a generally U-shaped bridge or nose piece 40 of metal, but preferably of plastic, having a base 50 from which a tab 60 projects, the tab 60 being shaped to engage and lock into a notch 30 at the center of the frame bar 20. The frame 10 also includes two circular lens carriers 70 of metal, but preferably of plastic each having a tab 80 extending from its periphery for engaging and locking in a notch 30 in the frame bar. It is noted that with the plurality of notches 30 provided,, the lens carriers 70 can be inserted into suitable notches for a wider variety of eye spacings.

It is noted that the lens carriers should be perfectly circular so that they can receive circular lenses. With such an arrangement there is no need for machining either the lens carrier or the lens which is to be inserted therein. Other standardized shapes can be used.

Figure 3:
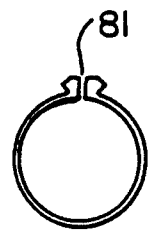
FIG. 3 is a front elevational view of a modification of a portion of the invention.

In one form, shown in FIG. 3, the tab 80 of the lens carrier 70 is split at 81 so that the halves of the lens carrier thus formed can be spread apart to facilitate the insertion of lenses. When the tab 70 is inserted in a notch 30 the two halves of the lens carrier are forced tightly together and a lens can be held securely.

The surface of the back of the lens carrier 80 also carries a series of numbers or other markings (not shown) to permit the technician to easily rotate the lens to the desired axis.

Finally, the eyeglass frame 10 includes a flexible headband 90 having at its ends, tabs 100 which can be inserted into notches 30 at the ends of the frame bar 20. With the headband secured to the frame bar,, the headband can be placed around the head to hold the eyeglass frame in place on the head of the wearer.

It is noted that the eyeglass frame described herein is completely universal and can be adjusted to substantially any patient. This permits the frame to be particularly useful in providing service in remote rural areas and in third world countries.

What is claimed is:

1. A universal eyeglass frame comprising
   a straight relatively rigid bar having a plurality of notches disposed along its length.
   a generally U-shaped nose piece having a tab adapted to be inserted in and locked in the central notch in said bar.
   a pair of lens holders having tabs for insertion in selected notches in said bar so the spacing between said lens holders and the lenses carried thereby can be adjusted, and
   a headband having tabs for insertion in notches in said frame bar.

2. The frame defined in claim 1 wherein said lens holders are circular in shape to receive circular lenses.

3. The frame defined in claim 1 wherein said lens holders and said lenses have a similar standardized shape.

4. The frame defined in claim 1 wherein said lens holders are circular members having a split body whereby they can be spread apart to permit lenses to be inserted with ease, the split body being held together when the lens holders are inserted in said rigid bar.

5. The frame defined in claim 1 wherein said lens holders comprise circular members which define a circular frame, a split in said frame whereby the lens holders can be enlarged to simplify the insertion of a lens, the split frame being firmly held together when the lens holder is inserted in a notch in said rigid bar.

6. The frame defined in claim 1 wherein said rigid bar carries marking to facilitate coupling of other portions of said frame thereto.

7. The frame defined in claim 1 wherein said lens holders carry marking to assist an operator in mounting lenses therein.

* * * * *